(12) United States Patent
Selvaraj et al.

(10) Patent No.: US 11,865,982 B2
(45) Date of Patent: Jan. 9, 2024

(54) VEHICLE WIRING HARNESS HOUSING

(71) Applicants: Prabhu L Selvaraj, Farmington Hills, MI (US); Tim Coffin, Clarkston, MI (US); Michael J Petkus, Clarkston, MI (US); Robert Attisha, Waterford Township, MI (US); Seethal Doddannawar, Farmington Hills, MI (US); Brett A Swan, Clarkston, MI (US)

(72) Inventors: Prabhu L Selvaraj, Farmington Hills, MI (US); Tim Coffin, Clarkston, MI (US); Michael J Petkus, Clarkston, MI (US); Robert Attisha, Waterford Township, MI (US); Seethal Doddannawar, Farmington Hills, MI (US); Brett A Swan, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 277 days.

(21) Appl. No.: 17/346,963

(22) Filed: Jun. 14, 2021

(65) Prior Publication Data

US 2022/0396220 A1 Dec. 15, 2022

(51) Int. Cl.
*B60K 25/06* (2006.01)
*B60R 16/02* (2006.01)

(52) U.S. Cl.
CPC .......... *B60R 16/0215* (2013.01); *B60K 25/06* (2013.01); *B60Y 2410/115* (2013.01)

(58) Field of Classification Search
CPC ................ B60R 16/0215; B60K 25/06; B60Y 2410/115

USPC ........................................................ 174/72 A
See application file for complete search history.

(56) References Cited

U.S. PATENT DOCUMENTS

| | | | | |
|---|---|---|---|---|
| 4,815,984 A | * | 3/1989 | Sugiyama | B60R 16/0239 296/146.7 |
| 5,174,110 A | * | 12/1992 | Duesler | F02C 7/32 244/129.1 |
| 5,692,909 A | * | 12/1997 | Gadzinski | B60R 16/0238 174/72 A |
| 7,343,992 B2 | * | 3/2008 | Shingo | B60K 6/40 903/907 |

(Continued)

FOREIGN PATENT DOCUMENTS

JP 2019216533 * 12/2019

*Primary Examiner* — Timothy J Thompson
*Assistant Examiner* — Michael F McAllister
(74) *Attorney, Agent, or Firm* — Jeremy J. Klobucar

(57) ABSTRACT

In at least some implementations, a powertrain assembly, includes a combustion engine arranged to propel a vehicle, an electric motor arranged to propel a vehicle, a transmission coupled to the combustion engine and having a transmission housing and an output, an exhaust assembly coupled to the combustion engine, a drivetrain component driven for rotation by the output, multiple wires connected to the electric motor, and a housing. The housing has a first housing part and a second housing part that are coupled together to define an interior between them. At least one of the first housing part and the second housing part is coupled to the transmission housing, the wires are received within the interior and the housing is received between the transmission housing and both a portion of the exhaust assembly and a portion of the drivetrain component.

20 Claims, 3 Drawing Sheets

(56) References Cited

U.S. PATENT DOCUMENTS

| | | | |
|---|---|---|---|
| 8,651,216 B2* | 2/2014 | Wakatsuki | B60K 1/00 |
| | | | 180/291 |
| 10,701,846 B1 | 6/2020 | Kimoto | |
| 10,790,653 B2 | 9/2020 | Sugino | |
| 11,273,773 B2* | 3/2022 | Fujimura | H02G 3/0418 |
| 2004/0200647 A1* | 10/2004 | Shingo | B60K 6/40 |
| | | | 180/65.285 |
| 2005/0045357 A1* | 3/2005 | Ichikawa | H02G 3/0431 |
| | | | 174/50 |
| 2005/0162015 A1* | 7/2005 | Yamaguchi | B60R 16/0215 |
| | | | 307/10.1 |
| 2012/0217033 A1* | 8/2012 | Agusa | B60R 16/0215 |
| | | | 174/68.3 |
| 2012/0223574 A1* | 9/2012 | Tanahashi | H02G 3/00 |
| | | | 307/9.1 |
| 2012/0241212 A1* | 9/2012 | Ishida | B60R 16/0215 |
| | | | 174/70 C |
| 2014/0305136 A1* | 10/2014 | Taylor | F02C 7/20 |
| | | | 60/801 |
| 2015/0136480 A1* | 5/2015 | Kamigaichi | H02G 3/0437 |
| | | | 174/72 A |
| 2016/0315421 A1* | 10/2016 | Andou | H01R 11/12 |
| 2018/0205210 A1* | 7/2018 | Suenaga | H02G 3/0406 |
| 2019/0305531 A1* | 10/2019 | Fujimura | B60R 16/0215 |
| 2020/0027628 A1* | 1/2020 | Ikeda | H02G 3/04 |

* cited by examiner

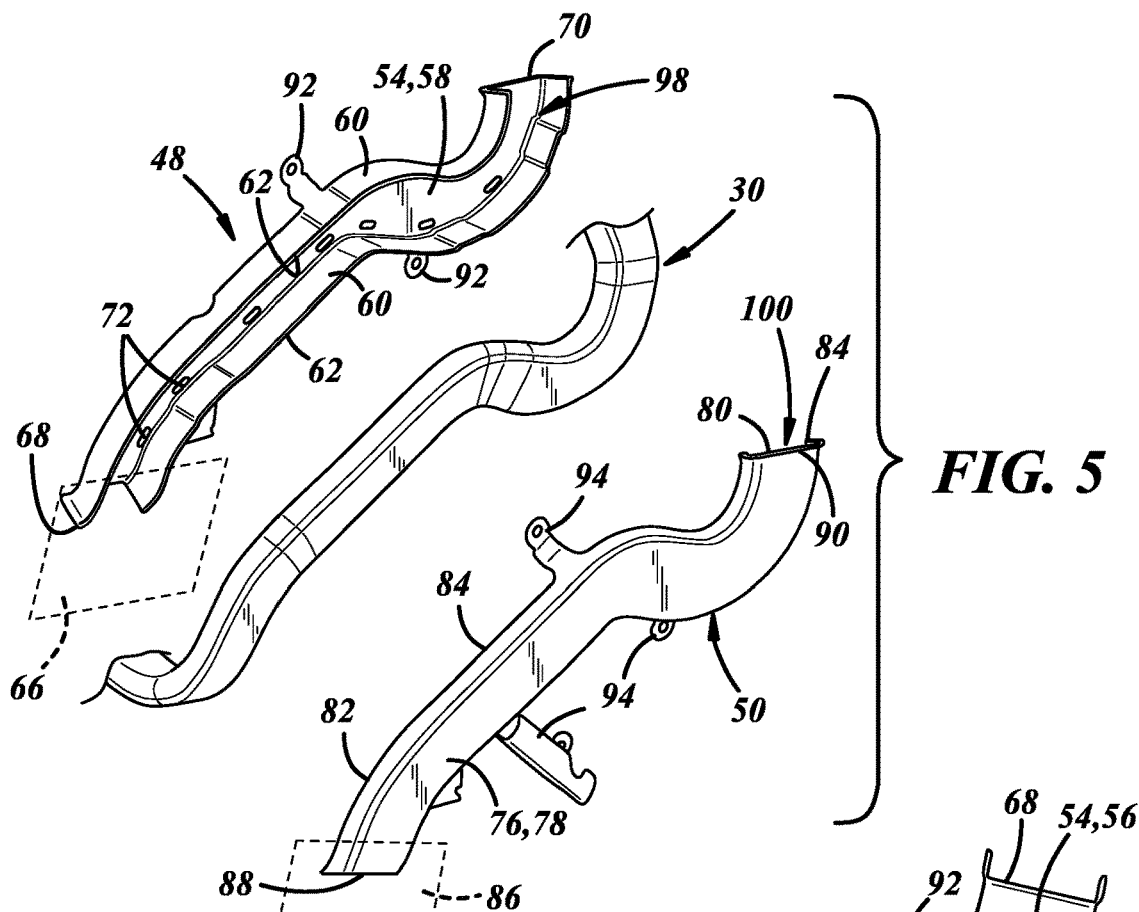
FIG. 5
FIG. 6
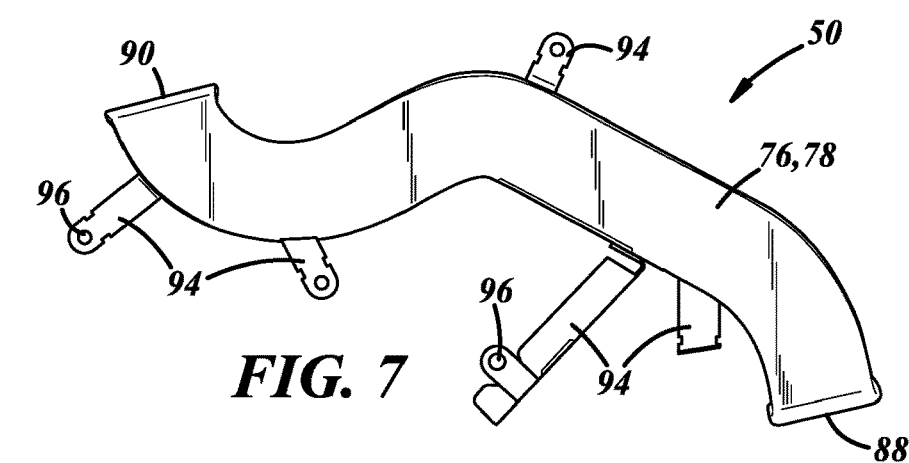
FIG. 7

VEHICLE WIRING HARNESS HOUSING

FIELD

The present disclosure relates to a housing for wiring routed within a vehicle, such as within or about a powertrain assembly.

BACKGROUND

Electrical wiring in a hybrid vehicle often must be routed closely adjacent to components in an engine compartment. The wires are subject to heat, e.g. from the engine and exhaust, wear from abrading against other components, and may be damaged during impact with other components such as during a vehicle collision. The wires may be constrained by plastic brackets or similar components to maintain their position and limit relative movement. Separate heat shields may be installed to provide thermal protection, and separate barriers or shields may be installed for impact protection. Among other things, the separate components increase manufacturing and assembly costs, and can reduce available space within an engine compartment.

SUMMARY

In at least some implementations, a powertrain assembly, includes a combustion engine arranged to propel a vehicle, an electric motor arranged to propel a vehicle, a transmission coupled to the combustion engine and having a transmission housing and an output, an exhaust assembly coupled to the combustion engine, a drivetrain component driven for rotation by the output, multiple wires connected to the electric motor, and a housing. The housing has a first housing part and a second housing part that are coupled together to define an interior between them. At least one of the first housing part and the second housing part is coupled to the transmission housing, the wires are received within the interior and the housing is received between the transmission housing and both a portion of the exhaust assembly and a portion of the drivetrain component.

In at least some implementations, all portions of the wires that are within six inches of any part of the exhaust assembly, are within the interior of the housing. In at least some implementations, the first housing part and second housing part are both formed from metal.

In at least some implementations, the first housing part has a base wall and a pair of sidewalls with each sidewall of the first housing part extending from the base wall of the first housing part to a free end, and the second housing part has a base wall and a pair of sidewalls with each sidewall of the second housing part extending from the base wall of the second housing part to a free end. When coupled together, the sidewalls of the second housing part overlap the sidewalls of the first housing part, and the base wall of the second housing part is spaced apart from the base wall of the first housing part by a distance at least equal to the corresponding dimension of the portion of the wires received in the interior.

In at least some implementations, the first housing part is secured to the transmission housing with an inner surface of the base wall of the first housing part, that defines part of the interior, facing away from the transmission housing, and wherein the second housing part is secured to one or both of the first housing part and the transmission housing with an inner surface of the base wall of the second housing part facing toward the base wall of the first housing part. In at least some implementations, a plane including the junctions between the base wall of the first housing part and both sidewalls of the first housing part is within twenty degrees of parallel to a longitudinal axis of the transmission housing.

In at least some implementations, the housing is received in a space defined between the drivetrain component and the transmission housing, and within 2 inches of the drivetrain component and within six inches of part of the exhaust assembly.

In at least some implementations, the first housing part defines a first channel and the second housing part defines a second channel and when the first housing part and second housing part are coupled together, the first channel and second channel are overlapped and define the interior of the housing. In at least some implementations, the first channel is defined by a base wall and spaced apart sidewalls of the first housing part, and the second channel is defined by a base wall and spaced apart sidewalls of the second housing part, and when the first housing part and second housing part are coupled together, the sidewalls of the first housing part and the sidewalls of the second housing part are overlapped.

In at least some implementations, the distance between the base wall of the first housing part and the base wall of the second housing part is equal to or within 20% of the corresponding dimension of the wires. In at least some implementations, the wires are within a wiring harness and two sidewalls and/or are closer to the wiring harness than the other two sidewalls and/or and the distance between the two sidewalls that are closer to the wiring harness is equal to or within 20% of the corresponding dimension of the wiring harness.

In at least some implementations, the first housing part includes multiple voids, and wherein one or more retainers are received in the voids and overlapped with the wires to retain the wires relative to the first housing part.

In at least some implementations, the first housing part and second housing part both include mounts by which the first housing part and second housing part are secured to the transmission housing. In at least some implementations, the first housing part is received between the second housing part and the transmission housing, and at least one mount of the second housing part is aligned with at least one mount of the first housing part so that a single fastener can connect both mounts, to the transmission housing.

In at least some implementations, a wiring harness assembly includes a wiring harness having a first end and a second end, a first housing part, at least one retainer securing at least a portion of the wiring harness to the first housing part, and a second housing part overlapping at least a portion of the first housing part. An interior is defined between the first housing part and the second housing part and a portion of the wiring harness is received in the interior such that the portion of the wiring harness in the interior is surrounded by surfaces of the first housing part and second housing part.

In at least some implementations, the first housing part defines a first channel and the second housing part defines a second channel and when the first housing part and second housing part are coupled together, the first channel and second channel are overlapped and define the interior. In at least some implementations, the first channel is defined by a base wall and spaced apart sidewalls of the first housing part, and the second channel is defined by a base wall and spaced apart sidewalls of the second housing part, and when the first housing part and second housing part are coupled together, the sidewalls of the first housing part and the sidewalls of the second housing part are overlapped.

In at least some implementations, the distance between the base wall of the first housing part and the base wall of the second housing part is equal to or within 20% of the corresponding dimension of the wiring harness. In at least some implementations, two sidewalls and/or are closer to the wiring harness than the other two sidewalls and/or and the distance between the two sidewalls that are closer to the wiring harness is equal to or within 20% of the corresponding dimension of the wiring harness.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 5 is an exploded perspective view showing the first and second housing parts and a portion of the wiring harness;

FIG. 6 is another view of the first housing part; and

FIG. 7 is another view of the second housing part.

DETAILED DESCRIPTION

Figure 1:
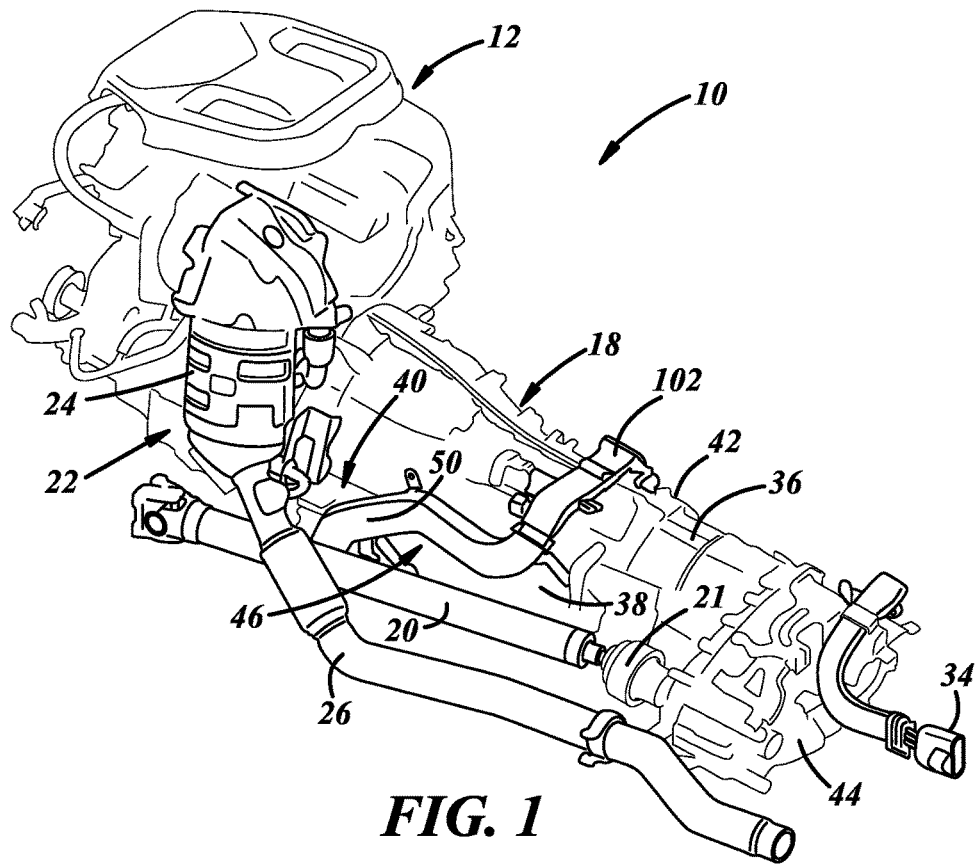
FIG. 1 is a perspective view of a vehicle powertrain assembly including a wiring harness and housing for same.
Figure 2:
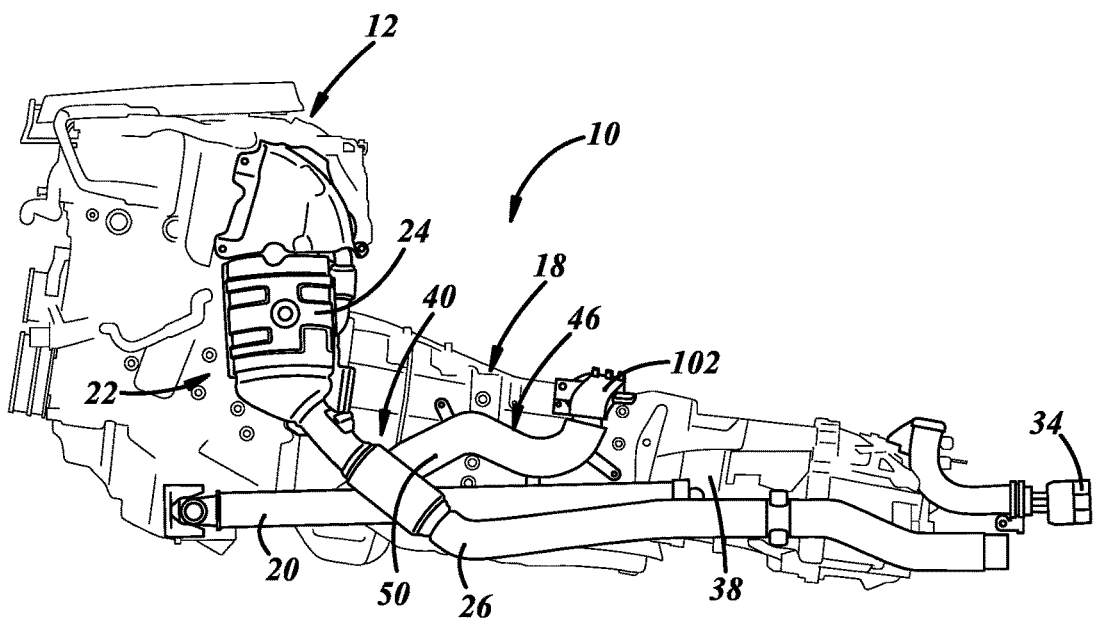
FIG. 2 is a side view of the powertrain assembly.

Referring in more detail to the drawings, FIGS. 1 and 2 illustrate the powertrain 10 of a hybrid vehicle that has two types of motive sources including a combustion engine 12 and one or more electric motors 14 (FIGS. 3 and 4) that are commanded to propel the vehicle separately or together. The engine 12 is mounted in an engine compartment of the vehicle, for example, toward the front of the vehicle under a vehicle hood. The engine 12 is coupled to a transmission 18 which is in turn coupled to a drivetrain of the vehicle. The drivetrain includes a drive shaft 20 that is driven by an output 21 of the transmission, and is connected to side shafts (not shown) via differentials and other known devices, and the side shafts are connected to the vehicle wheels. Power generated via combustion events in the engine 12 is transmitted to the wheels via the transmission 18 and drivetrain. Combustion gases are exhausted from the engine 12 through an exhaust assembly 22 including an exhaust manifold 24 at the engine 12 and leading to an exhaust pipe 26 which leads to an outlet (e.g. tailpipe) from which exhaust is discharged from the vehicle.

Figure 3:
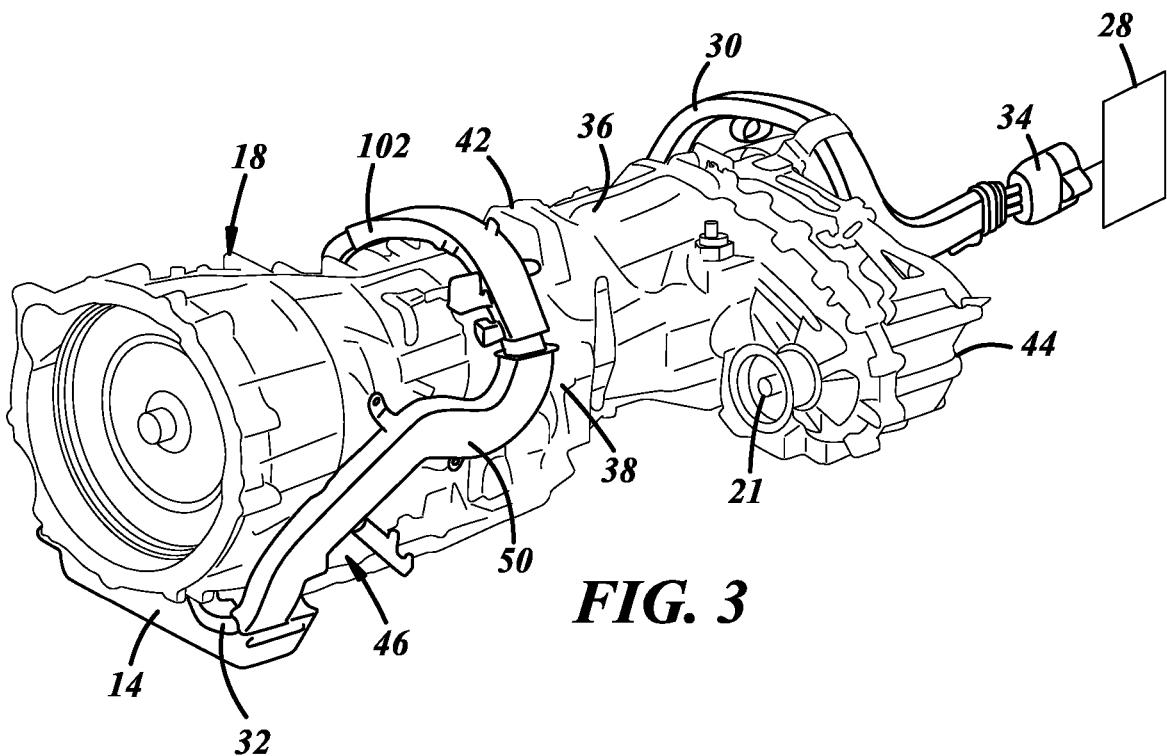
FIG. 3 is a perspective view of a transmission and the wiring harness and housing.
Figure 4:
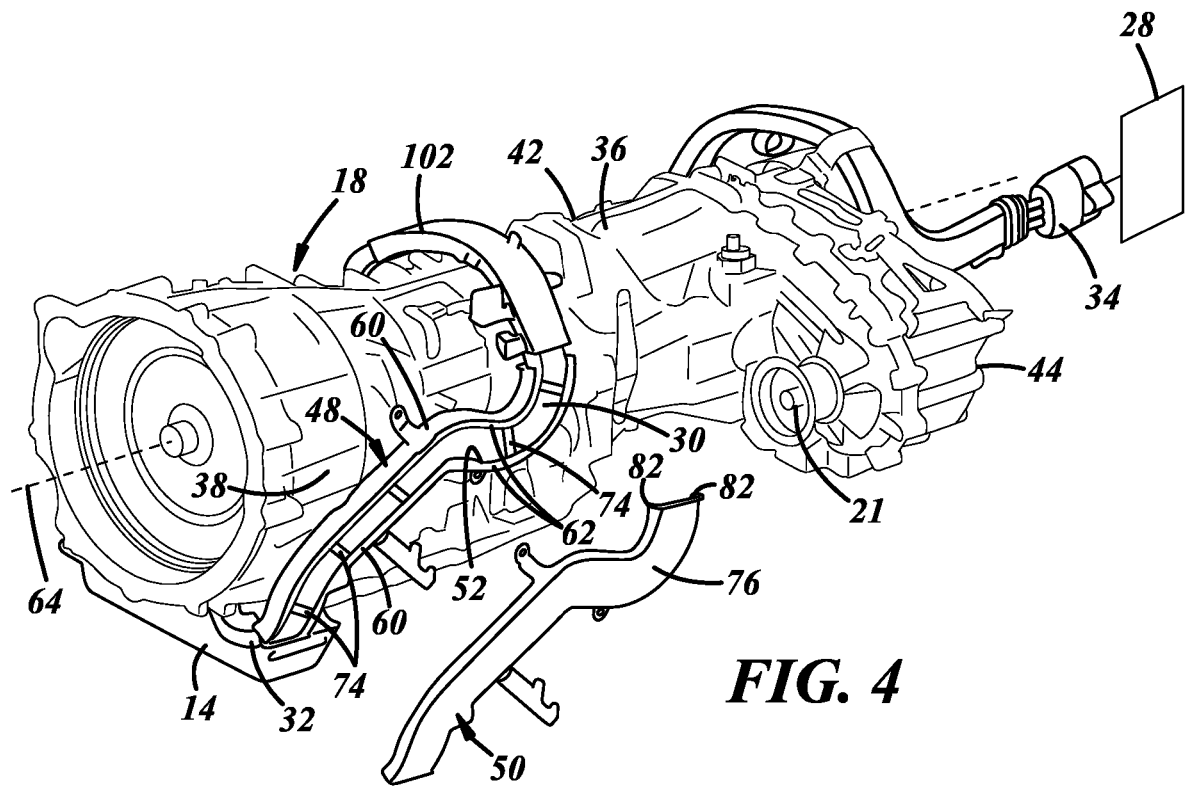
FIG. 4 is a view similar to FIG. 3, with a second housing part shown removed from a first housing part with the wiring harness received in the first housing part.

As shown in FIGS. 3 and 4, the one or more electric motors 14 may be mounted to or otherwise incorporated with or within the transmission 18 to provide a motive force separately from or in concert with the combustion engine 12, to propel the vehicle. An inverter 28 is installed near the engine 12 or transmission 18, and is connected with a battery (not shown) and with the motors by a plurality of high voltage wires which may be arranged in a so-called wiring harness 30. The inverter 28 converts direct current from the battery into alternating current supplied to the motor(s), and may converts alternating current generated by the motor(s) (e.g. which may also function as generators) into direct current to charge the battery.

The wiring harness 30 may include a cover in which multiple wires may be routed with connectors 32, 34 located at one or both ends of the wires. While the figures are described with referent to a wiring harness, the wires may be separate and not within a harness, as desired. Accordingly, reference herein to a wiring harness 30 is intended to include one or more wires in any desired arrangement. The wiring harness 30 is routed from the motor(s) at a location beneath a housing 36 of the transmission, and along a first side 38 of the transmission housing 36 in a space 40 (FIGS. 1 and 2) between the transmission housing 36, drive shaft 20 and exhaust manifold 24 or exhaust pipe 26. From the space 40, in the example shown, the wiring harness 30 passes over the transmission housing 36 to an opposite, second side 42 of the transmission housing 36 along which the wiring harness 30 is routed to a distal end 44 (opposite from the engine 12) of the transmission housing 36 at which the wiring harness 30, via an end connector 34, may be coupled to the inverter 28.

Especially within the area including the drive shaft 20 and exhaust manifold 24/exhaust pipe 26, the wiring harness 30 can be subjected to relatively high heat and some relative movement between the wiring harness 30 and the transmission 18, including but not limited to vibrations. And in the event of a vehicle collision, the drive shaft 20 or adjacent components may impact and damage the wiring harness 30 and its wires. To, among other things, maintain the wiring harness 30 close to the transmission housing 36 and thereby limit physical interference with or by other components in the engine compartment, and protect the wiring harness 30 from damage due to relative movement, impact and heat, a housing 46 is provided over at least a portion of the wiring harness 30. The housing 46 is formed in more than one part, and in the example shown includes a first housing part 48 adjacent to the transmission 18 and a second housing part 50 that overlies at least part of the first housing part 48, as best shown in FIGS. 4-7. An interior 52 is defined between the first housing part 48 and second housing part 50 and a portion of the wiring harness 30 is received in the interior 52 of the housing 46, as set forth in more detail below.

In at least some implementations, as shown in FIGS. 5 and 6, the first housing part 48 includes a base wall 54 having an outer surface 56 located adjacent to an exterior of the transmission housing 36 and an inner surface 58 facing away from the transmission housing 36. Two sidewalls 60 are provided, and each may be cantilevered at one end or otherwise coupled to a separate or respective one of the two sides or edges of the base wall 54. The sidewalls 60 extend in the same direction away from the base wall 54 to a free end 62 spaced from the base wall 54. The base wall 54 may be generally planar and generally parallel to a longitudinal axis 64 (labeled in FIG. 4) of the transmission 18, where generally means that the base wall curves not more than 4 times the diameter or dimension of the wiring harness in the direction of the bend (e.g. a bend radius is not more than 4 times the diameter of a wire or the wiring harness in the direction of the bend). The sidewalls 60 may be perpendicular or within twenty (20) degrees of perpendicular from the base wall 54, and may extend along the full length of the base wall 54 from a first end 68 to a second end 70, and may be continuous or may include breaks, voids or other discontinuities, as desired. The sidewalls 60 may extend away from the base wall 54 the same distance or different distances, and the distance of a free end 62 to the base wall 54 may vary along the length of a sidewall 60.

One or more voids 72 may extend through the first housing part 48 and, in at least some implementations, multiple voids 72 are provided through the base wall 54, with voids located adjacent to both sidewalls 60. In assembly, one or more retainers 74 (FIG. 4) may be used to maintain the position of the wiring harness 30 relative to the first housing part 48, to reduce or eliminate relative movement between them. The retainer(s) 74 may be a cord or strap wound in serpentine manner through the voids 72 and over the wiring harness 30 several times. In other implementations, the retainer(s) 74 may include multiple separate straps, like cable ties, having opposite ends received through the voids 72 and then wrapped over the wiring harness 30 wires before connecting the ends of a strap together and tightening the strap.

In at least some implementations, the second housing part 50 includes a base wall 76 having an outer surface 78 facing away from the transmission housing 36 and an inner surface 80 facing toward the transmission housing 36 and facing toward the inner surface 58 of the base wall 54 of the first housing part 48. The second housing part 50 also may include two sidewalls 82, and each may be cantilevered at one end or otherwise coupled to a separate or respective one of the two sides of the base wall 76. The sidewalls 82 extend in the same direction away from the base wall 76 to respective free ends 84 spaced from the base wall 76. The base wall 76 may be generally planar and generally parallel to the longitudinal axis 64 of the transmission 18, where generally means that the base wall curves not more than 4 times the diameter or dimension of the wiring harness in the direction of the bend. The sidewalls 82 may be perpendicular or within twenty (20) degrees of perpendicular from the base wall 76, and may extend along the full length of the base wall 82 from a first end 88 to a second end 90, and may be continuous or may include breaks, voids or other discontinuities, as desired. The sidewalls 82 may extend away from the base wall 76 the same distance or different distances, and the distance of a free end 84 to the base wall 76 may vary along the length of a sidewall 82.

As shown in FIGS. 6 and 7, one or both of the first housing part 48 and second housing part 50 may include brackets. In at least some implementations, the first housing part 48 has multiple mounts or brackets 92 and the second housing part 50 has multiple mounts or brackets 94 extending outwardly from an exterior of the respective housing parts 48, 50. The brackets 92, 94 may be integrally formed with the housing part 48, 50, or may be coupled thereto, such as by a fastener, adhesive, weld, interference fit or the like. The brackets 92, 94 may include an opening 96 through which a fastener may extend for connection to the transmission housing 36, e.g. in a threaded bore that is open at the exterior of the transmission housing 36. In the example shown, both the first housing part 48 and second housing part 50 include multiple brackets 92, 94, and when the housing 46 is assembled, at least some of the brackets 92, 94 of the housing parts 48, 50 are aligned so that a single fastener may extend through aligned openings in a bracket 92 of the first housing part 48 and a bracket 94 of the second housing part 50 to couple both brackets to the transmission housing 36. Of course, the brackets 92, 94 may be separately coupled to the transmission housing, if desired.

In this way, both housing parts 48, 50 are secured to the transmission housing 36. Of course, one of the housing parts 48 or 50 could be connected to the transmission housing 36 while the other of the housing parts 48 or 50 is connected to the housing part that is connected to the transmission 18. And each housing part 48, 50 may be connected to the transmission housing 36 at one or more locations and be also connected to the other housing part. The connection between the housing parts 48, 50 may be achieved in any desired manner, such as by, but not limited to, overlapped or interlocking flanges, fasteners like bolts, adhesives, tape, straps, welds or the like.

In assembly, the wiring harness 30 may be placed within a channel 98 of the first housing part 48, defined by and between the sidewalls 60 and base wall 54. The channel 98 may be open and continuous along its length and may be contoured (e.g. curved) to route the wiring harness 30 in a desired path along the transmission exterior. After being installed on or in the first housing part 48, the wiring harness 30 may be secured to the first housing part 48 by one or more retainers 74.

The second housing part 50 may be provided over the first housing part 48, with the base wall 76 overlapping the wiring harness 30 or wires, and the sidewalls 82 of the second housing part 50 at least partially overlapping the sidewalls 60 of the first housing part 48. That is, the second housing part 50 defines an opposite facing channel 100 that is complementary in shape, and which may be coextensive in length, to the channel 98 of the first housing part 48 so that the second housing part 50 overlaps the wiring harness 30 along the path defined by the first housing part 48. When assembled together, the channels 98, 100 and housing parts 48, 50 define the interior 52 in which a portion of the wiring harness 30 is received. So arranged, the portion of the wiring harness 30 in the interior 52 is surrounded by surfaces of the first housing part 48 and second housing part 50.

In at least some implementations, the interior 52 may have a height defined between the opposed base walls 54, 76 that is equal to or greater than a corresponding dimension of the wiring harness 30 by less than 20%. The interior 52 has a width defined between opposed sidewalls 60, 82 that is equal to or greater than a corresponding dimension of the wiring harness 30 by less than 20%. As noted above, in the final assembled state, the first housing part 48 and/or second housing part 50 is/are secured to the transmission 18 with the wiring harness 30 securely trapped between the first housing part 48 and second housing part 50. In at least some implementations, the wiring harness may be routed through different housings in areas outboard of the housing 46, such as through a plastic cover 102 (FIGS. 1-4) that is outboard of the space 40 and located farther from the exhaust assembly 22 and drive shaft 20. In at least some implementations, the plastic cover 102 may maintain a position of the wiring harness relative to portions of the transmission housing 36, and may protect the wiring harness from abrasion that may otherwise occur due to movement relative to the transmission housing.

So arranged, the base wall 54 of the first housing part 48 separates the wiring harness 30 from the transmission housing 36 to protect against abrasion or other damage that may be caused if the wiring harness 30 could directly contact the transmission 18. The base wall 76 of the second housing part 50 and the sidewalls 60, 82 of both housing parts 48, 50 overly the wiring harness 30 and protect it from impact by objects external to the transmission 18, like the drive shaft 20 or a portion of the exhaust assembly 22, or other vehicle component displaced (e.g. during a collision) or debris (e.g. a rock) or other object that enters the engine compartment. Further, along its length from the first end 68 to the second end 70, the base wall 54 of the first housing part 48 may be located within one inch of the exterior of the transmission housing 36, and in some implementations is within 0.5 inch. Also, securing the housing 46 to the transmission housing 36 reduces or eliminates relative motion between the housings 36, 46 and thus reduces relative movement of the wiring harness 30 relative to the transmission 18. The reduction in relative movement may be enhanced by forming the housing 46 to relatively closely receive the wiring harness 30 to reduce movement of the wiring harness 30 relative to the housing 46, which can reduce wear on the wires and reduce loads on the connectors 32, 34 at each end of the wiring harness 30.

In at least some implementations, both the first housing part 48 and second housing part 50 are formed from metal, such as steel or aluminum, and thus are able to withstand the heat from the exhaust assembly 22 and to resist puncture or significant deformation (bending or crushing) under significant impact loads, to physically protect the wiring harness 30. The housing parts 48, 50 may be coated for galvanization, and may have a heat resistant powder coat applied to improve thermal protection of the wiring harness 30. The coating may be applied in any desired manner, such as by dipping or powder coating, formed from or include silver and/or zinc, with a representative coating being sold under the tradename MAGNI 565. The housing parts 48, 50 may conveniently be stamped, although the parts may also be made by other methods such as extrusion.

In at least some implementations, the sidewalls 60 of the first housing part 48 may be received between the wiring harness 30 and the sidewalls 82 of the second housing part 50, and the sidewalls 60 of the first housing part 48 may, along at least a majority of their length, have a height from the base wall 54 to the free ends 62, that is greater than the corresponding dimension of the wiring harness 30. During an impact, deformation of the base wall 76 of the second housing part 50 may be resisted by engagement of the base wall 76 with the free ends 62 of the sidewalls 60 of the first housing part 48, to inhibit or prevent undue compression of the wiring harness 30 between the base walls 54, 76.

In at least some implementations, the housing 46 is located along the entire length of the wiring harness 30 that are within six inches of any portion of the exhaust assembly 22, in at least some implementations, the housing is provided for any portion of the wiring harness within four inches of a portion of the exhaust assembly 22. The voids 72 in the first housing part 48 may, in addition to receiving retainers 74 that couple the wiring harness 30 to the first housing part 48, facilitate heat transfer (e.g. by air flow) from the housing 46 and wiring harness 30. One or more voids may also be provided in the second housing part 50, if desired. In at least some implementations, separate heat shields and structures to protect the wiring harness from damage are not needed as the housing limits or prevents movement of the wires relative to adjacent components, protects the wires from heat, and protects the wires from impact.

What is claimed is:

1. A powertrain assembly, comprising:
a combustion engine arranged to propel a vehicle;
an electric motor arranged to propel a vehicle;
a transmission coupled to the combustion engine and having a transmission housing and an output;
an exhaust assembly coupled to the combustion engine;
a drivetrain component driven for rotation by the output;
multiple wires connected to the electric motor; and
a housing having a first housing part and a second housing part that are coupled together to define an interior between them, and wherein at least one of the first housing part and the second housing part is coupled to the transmission housing, the wires are received within the interior and the housing is received between the transmission housing and both a portion of the exhaust assembly and a portion of the drivetrain component, wherein the first housing part includes multiple voids, and wherein one or more retainers are received in the voids and overlapped with the wires to retain the wires relative to the first housing part.

2. The assembly of claim 1 wherein, all portions of the wires that are within six inches of any part of the exhaust assembly, are within the interior of the housing.

3. The assembly of claim 2 wherein the first housing part and second housing part are both formed from metal.

4. The assembly of claim 1 wherein the first housing part has a base wall and a pair of sidewalls with each sidewall of the first housing part extending from the base wall of the first housing part to a free end, and the second housing part has a base wall and a pair of sidewalls with each sidewall of the second housing part extending from the base wall of the second housing part to a free end, and when coupled together, the sidewalls of the second housing part overlap the sidewalls of the first housing part, and the base wall of the second housing part is spaced apart from the base wall of the first housing part by a distance at least equal to the corresponding dimension of the portion of the wires received in the interior.

5. The assembly of claim 4 wherein the first housing part is secured to the transmission housing with an inner surface of the base wall of the first housing part, that defines part of the interior, facing away from the transmission housing, and wherein the second housing part is secured to one or both of the first housing part and the transmission housing with an inner surface of the base wall of the second housing part facing toward the base wall of the first housing part.

6. The assembly of claim 5 wherein a plane including the junctions between the base wall of the first housing part and both sidewalls of the first housing part is within twenty degrees of parallel to a longitudinal axis of the transmission housing.

7. The assembly of claim 1 wherein the housing is received in a space defined between the drivetrain component and the transmission housing, and within two inches of the drivetrain component and within six inches of part of the exhaust assembly.

8. The assembly of claim 1 wherein the first housing part defines a first channel and the second housing part defines a second channel and when the first housing part and second housing part are coupled together, the first channel and second channel are overlapped and define the interior of the housing.

9. The assembly of claim 8 wherein the first channel is defined by a base wall and spaced apart sidewalls of the first housing part, and the second channel is defined by a base wall and spaced apart sidewalls of the second housing part, and when the first housing part and second housing part are coupled together, the sidewalls of the first housing part and the sidewalls of the second housing part are overlapped.

10. The assembly of claim 9 wherein the distance between the base wall of the first housing part and the base wall of the second housing part is equal to or within twenty percent of the corresponding dimension of the wires.

11. The assembly of claim 9 wherein the wires are within a wiring harness and two sidewalls and/or are closer to the wiring harness than the other two sidewalls and/or and the distance between the two sidewalls that are closer to the wiring harness is equal to or within twenty percent of the corresponding dimension of the wiring harness.

12. The assembly of claim 1 wherein the first housing part~~first housing part~~ includes a first channel that is defined by a base wall and spaced apart sidewalls of the first housing part, and wherein the voids are formed in the base wall.

13. A powertrain assembly, comprising:
a combustion engine arranged to propel a vehicle;
an electric motor arranged to propel a vehicle;
a transmission coupled to the combustion engine and having a transmission housing and an output;
an exhaust assembly coupled to the combustion engine;
a drivetrain component driven for rotation by the output;
multiple wires connected to the electric motor; and
a housing having a first housing part and a second housing part that are coupled together to define an interior between them, and wherein at least one of the first housing part and the second housing part is coupled to the transmission housing, the wires are received within the interior and the housing is received between the transmission housing and both a portion of the exhaust assembly and a portion of the drivetrain component, wherein the first housing part and second housing part both include mounts that are integrally formed with a respective one of the first housing part and the second housing part, and by which the first housing part and second housing part are secured to the transmission housing.

14. The assembly of claim 13 wherein the first housing part is received between the second housing part and the transmission housing, and at least one mount of the second housing part is aligned with at least one mount of the first housing part so that a single fastener can connect both mounts, to the transmission housing.

15. A wiring harness assembly, comprising:
a wiring harness having a first end and a second end,
a first housing part;
at least one retainer securing at least a portion of the wiring harness to the first housing part; and
a second housing part overlapping at least a portion of the first housing part, wherein an interior is defined between the first housing part and the second housing part and a portion of the wiring harness is received in the interior such that the portion of the wiring harness in the interior is surrounded by surfaces of the first housing part and second housing part.

16. The assembly of claim 15 wherein the first housing part defines a first channel and the second housing part defines a second channel and when the first housing part and second housing part are coupled together, the first channel and second channel are overlapped and define the interior.

17. The assembly of claim 16 wherein the first channel is defined by a base wall and spaced apart sidewalls of the first housing part, and the second channel is defined by a base wall and spaced apart sidewalls of the second housing part, and when the first housing part and second housing part are coupled together, the sidewalls of the first housing part and the sidewalls of the second housing part are overlapped.

18. The assembly of claim 17 wherein the distance between the base wall of the first housing part and the base wall of the second housing part is equal to or within twenty percent of the corresponding dimension of the wiring harness.

19. The assembly of claim 17 wherein two sidewalls and/or are closer to the wiring harness than the other two sidewalls and/or and the distance between the two sidewalls that are closer to the wiring harness is equal to or within twenty percent of the corresponding dimension of the wiring harness.

20. The assembly of claim 12 wherein the retainers include a cord, strap or cable tie that extends through at least two voids and over the wires to maintain the position of the wires relative to the first housing part.

* * * * *